3,101,329
METHOD OF FORMING FINE POLYETHYLENE POWDERS
Francis M. Sweeney, East Hempfield, Pa., assignor to Armstrong Cork Company, Lancaster, Pa., a corporation of Pennsylvania
No Drawing. Filed Sept. 26, 1962, Ser. No. 229,254
5 Claims. (Cl. 260—94.9)

This invention relates generally to the forming of fine powders from polymeric substances and more particularly to the forming of fine polyethylene powders. Still more particularly, the invention relates to the forming of fine polyethylene powders from low molecular weight polyethylene without the use of mechanical attrition, solvents, or chemical precipitation methods.

It has long been recognized that a material can usually be produced as a fine powder by dissolving it in a solvent, followed by pouring it into a nonsolvent for the material with agitation. In the case of polyethylene, it is difficult to disperse the polyethylene in a solvent since at any temperature at which the polyethylene is appreciably soluble the particles tend to coalesce and become an intractable mass prior to solution.

This situation has been sufficiently widely recognized that various alternative procedures have been developed for forming fine powders of polyethylene. Some of these processes utilize a combination of solvent action and mechanical attrition. These processes are best exemplified by U.S. Patent 2,727,693, Cairns; U.S. 2,858,299, Guzzetta; U.S. 2,451,743, Jarrett; and U.S. 2,870,113, Jones. Another prior process for forming fine polyethylene powder wherein polyethylene lumps are admixed with a solvent-nonsolvent mixture at a temperature less than the melting point of the polyethylene and the resulting mixture of polyethylene and the solvent-nonsolvent mixture is agitated to form a finely-divided polyethylene powder is disclosed by U.S. Patent 2,945,020, Hall.

Finely-divided solid polymers having uniform particle size are required in various applications. For example, in the preparation of solid compositions in which polyethylene is to be incorporated as a uniform dispersion, it is sometimes necessary that the very finely-dispersed polyethylene be of uniform particle size. This is true also in the preparation of plastisols.

It is apparent that there is a need for a process for reducing polyethylene to a fine powder which does not involve the use of attrition or mechanical grinding, nor the use of a potentially dangerous solvent or solvent and nonsolvent mixture which would require subsequent removal of the solvent and/or nonsolvent from the powder.

It is the primary object of the present invention to supply such a process. It is a further object of the present invention to supply a process whereby pellets or pieces of polyethylene may be reduced to an extremely fine powder of polyethylene by simply forming a liquid-liquid dispersion of polyethylene and the liquid condenstation product of ethylene oxide and propylene oxide and rapidly cooling the same.

It is a still further object to provide a simple and efficient process for producing powdered polyethylene of uniform particle size.

These objects are accomplished in a surprisingly simple and effective manner. The invention contemplates mixing and heating relative proportions of up to about 100 parts by weight polyethylene with 100 parts by weight of a liquid condensation product of ethylene oxide and propylene glycol. These polyethers are nonsolvents for the polyethylene and are inactive with it at the temperatures employed. The temperature of the mixture should be maintained above the melting point of the polyethylene and below the thermal degradation point of the dispersing agent in the range of about 200° F. to 300° F. The resulting mixture of the polyethylene and the polyether is then agitated at high speed in the above-stated temperature range for a period of 2 to 3 minutes to form a liquid-liquid dispersion. The resin is in a liquid state at this temperature but is not miscible in the polyether. The densities of the two liquids at this stage are substantially identical and consequently a two layer system is not readily formed. Only slight agitation at this stage is necessary to maintain liquid-liquid dispersion.

The invention is applicable to all polyethylene polymers having a molecular weight up to about 10,000. It is entirely possible, however, with the use of higher temperatures and pressures to use the present process in connection with ethylene polymers having substantially higher molecular weights. In particular, the polymers known as AC-6 and DYDT lend themselves peculiarly to the present process. These are low temperature and low pressure polymers, having molecular weights of 2,000 and 4,000, respectively. Many of the polyethylenes prepared under relatively low pressures and temperatures in the presence of a catalyst system and usable in the present process were prepared by the method of U.S. 2,699,457, Ziegler et al.

The polyethers used are polypropylene oxide polymers which are treated with ethylene oxide. The base unit of one polyether used in the process of this invention has a molecular weight of 1,000-2,000 and contains 40-50% by weight ethylene oxide. The base unit of another polyether used in our process has a molecular weight of 1,500-1,800 and contains about 10% by weight ethylene oxide. These polyethers are from a series of such material commercially available from the Wyandotte Chemical Company, under the name Pluronics. They have the empirical formula

where $a$, $b$, and $c$ are of sufficient size to give the required molecular weight as stated earlier and also introduce into the compound the required proportions of ethylene oxide and propylene glycol as stated earlier. Other polyethers, or polypropylene adducts having the same density as molten polyethylene, could be used to disperse polyethylene in the same manner as those mentioned above.

The polyethylene in the form of lumps, chunks, pellets, flakes, or any convenient form, is placed in the polyether liquid in an amount of 5–100 parts by weight polyethylene per 100 parts by weight of the polyether. Amounts smaller than the above-stated minimum are not feasible in view of the small amount of powder and large amount of dispersing liquid present. Amounts of polyethylene larger than the above-stated maximum merely make it more difficult to obtain a uniform dispersion.

The temperature at which the process is to be conducted must be above the melting point of the polyethylene and will, in any case, be in the range of 200–300° F. Elevated pressures and higher temperatures will not be necessary nor desirable in the formation of the dispersion where low molecular weight polyethylene is used.

The mixture of polyethylene and the polyether liquid is heated to a temperature within the range indicated above to melt the polyethylene. High speed agitation is then employed to achieve the desired dispersal of the droplets of polyethylene throughout the polyether. It must be emphasized that the period and amount of agitation required is relatively small since the densities of both liquids at this stage are so close they do not tend to separate rapidly into two layers and with only a short period of agitation can easily be converted into a liquid-liquid dispersion.

The polyethylene powder is recovered from the dispersion by rapid cooling thereof which causes the polyethylene droplets to solidify and the polyethylene can then be filtered from the liquid as a powder. One method of cooling comprises pouring the hot liquid-liquid dispersion into a cold reservoir of water. However, other methods of cooling should work equally well.

Among the advantages of the present process over the prior processes for producing finely-divided polyethylene is that the present process not only produces powdered polyethylene of uniform particle size by a relatively simple and less hazardous method, but also lends itself to large scale operations. It not only does away with the need for using a potentially dangerous solvent but in addition makes unnecessary the subsequent removal of a solvent or a solvent-nonsolvent from the powder. The present process is limited only by the size of the container, vat, or autoclave for carrying out the mixing and heating operation, and may be utilized in amounts of 5,000 gallons and up.

The powder produced is well adapted to be used in dispersions to produce adherent, impermeable, continuous, flexible linear polyethylene coatings of good impact and peel resistance on metal substrates and various other surfaces by processes such as, for example, the fluidized bed method of U.S. Patent 3,032,816. Metal drums, buckets, and the like, may be coated by placing the powder inside the vessel to be coated, heating the vessel from the outside, and rolling the vessel to coat the interior.

Our invention is illustrated but in no way limited by the following example in which all parts given are by weight unless otherwise specified.

*Example*

In one of our tests, 150 grams of the polyether liquid was heated to 300° F. in a 600 ml. beaker, 150 grams of polyethylene resin in the form of pellets measuring about ¼ inch in diameter and ⅛ inch thick was added as fast as it could be melted and dispersed. That would be about 2 to 3 minutes. A simple laboratory propeller stirrer was used to disperse the polyethylene resin. When the mix reached a temperature of 300° F., which was within 2 to 3 minutes of the time for final addition of the resin, the 300 grams of mix was rapidly poured into a 5,000 ml. beaker containing about 4,000 ml. of water. Stirring was used to disperse the mix and facilitate cooling. The polyethylene powder was filtered out of the water using a Buchner funnel and filter paper. The powder, which measured less than 100 mesh, was air dried on a shallow tray.

I claim:

1. A method for converting solid polymers of ethylene into a powder which comprises mixing a low molecular weight ethylene polymer in particulate form in a liquid condensation product of ethylene oxide and propylene glycol, heating to a temperature sufficiently high to melt the resin but below the thermal degradation point of the condensation product, agitating the melted resin and condensation product to form a liquid-liquid dispersion, rapidly cooling the dispersion to solidify the dispersed resin droplets and recovering the solidified droplets from the dispersion.

2. A method for reducing the particle size of polyethylene which comprises admixing relative proportions of 5–100 parts by weight of granular polyethylene having a molecular weight in the range of 2,000–10,000 with 100 parts by weight of a liquid condensation product of ethylene oxide and propylene glycol heated to a temperature above the melting point of the polyethylene in the range of 200–300° F. and having approximately the same density as that of the molten polyethylene to form a liquid-liquid dispersion, agitating the dispersion for a period of 2 to 3 minutes to form finely-divided polyethylene and rapidly cooling the dispersion to solidify the dispersed resin droplets.

3. A method for producing finely-divided polyethylene powder which comprises heating a liquid condensation product of ethylene oxide and propylene glycol having a molecular weight of 1,000–1,800 and containing 10–50% by weight ethylene oxide to a temperature of about 300° F., progressively adding up to about 100 parts by weight of a solid ethylene polymer in sub-divided form having a molecular weight in the range of 2,000–10,000 to each 100 parts by weight of the heated liquid to form a dispersion of the liquid droplets of molten polyethylene in the dispersing liquid, agitating the dispersion at high speed to further divide the molten polyethylene droplets, rapidly cooling the dispersion to solidify the dispersed droplets by pouring the dispersion into a substantially cooler inert liquid, further agitating the mixture to disperse the mix and facilitate cooling thereof, filtering the resulting powdered polyethylene out of the dispersant, and drying the powder.

4. A method in accordance with claim 1 in which the molecular weight of the condensation product of ethylene oxide and propylene glycol is in the range of 1,000–1,200, the ethylene oxide content is 40–50% by weight, and the polyethylene has a molecular weight of about 2,000.

5. A method according to claim 1 in which the molecular weight of the condensation product of ethylene oxide and propylene glycol is in the range of 1,500–1,800, the ethylene oxide content is 10–20% by weight, and the polyethylene has a molecular weight of about 4,000.

References Cited in the file of this patent

UNITED STATES PATENTS

| | | |
|---|---|---|
| 2,451,743 | Jarrett | Oct. 19, 1948 |
| 2,727,693 | Cairns | Dec. 20, 1955 |
| 2,858,299 | Guzzetta | Oct. 28, 1958 |
| 2,870,113 | Jones | Jan. 20, 1959 |
| 2,945,020 | Hall | July 21, 1960 |
| 3,008,946 | Rhodes et al. | Nov. 14, 1961 |